Jan. 27, 1959     C. LAUXEN     2,870,647
GENEVA MOVEMENT

Filed Nov. 1, 1956     2 Sheets-Sheet 1

INVENTOR.
CARL LAUXEN
BY
ATTORNEY

Jan. 27, 1959

C. LAUXEN 2,870,647

GENEVA MOVEMENT

Filed Nov. 1, 1956

INVENTOR.
CARL LAUXEN
BY
ATTORNEY

United States Patent Office 2,870,647
Patented Jan. 27, 1959

2,870,647
GENEVA MOVEMENT

Carl Lauxen, Haddonfield, N. J., assignor to Radio Corporation of America, a corporation of Delaware Application November 1, 1956, Serial No. 619,875

11 Claims. (Cl. 74—436)

This invention relates to a system for transmitting intermittent motion. More particularly, it relates to a device for rapidly advancing film one frame at a time aperiodically as may be desired in a camera, in a projector, or in a film printer.

This invention has reference to an improvement applicable to use with gearing of the type known as a "Geneva gear," whereby the usefulness of this gear is considerably enhanced. Geneva mechanisms are well known to those skilled in the art. One form of Geneva mechanism comprises a driven disc known as a "star wheel" and having a plurality of radial slots or channels which are successively engaged by a pin on a driving disc at each revolution of the driving disc.

While Geneva mechanisms are applicable to many forms of apparatus, they are particularly useful in connection with intermittent driving mechanisms employed in operating film in motion picture machines. In such an application, the action is generally periodic. There are, however, instances where aperiodic motion of the driven member is desirable. One instance is in the operation of modern computing machines of the type which print out information recorded on tapes and where varying length messages, or varying numbers of prints, are to be provided.

It is an object of this invention to provide an improved Geneva mechanism which is especially suitable for use where aperiodic transfer of motion is desired.

More particularly, it is an object of this invention to provide an improved Geneva mechanism which can be operated to transfer motion either periodically or aperiodically at will.

Still a further object of this invention is the provision of an improved electromagnetically controlled Geneva mechanism.

The present invention incorporates the well known principles of the Geneva movement. According to the invention, there is provided a Geneva mechanism wherein the driving pin may be retracted at will. By retracting the driving pin in a Geneva mechanism, the output shaft of the Geneva is stopped. Thus, by proper control of the driving pin, the output action of the Geneva may be made either periodic or aperiodic. Such a retraction may be achieved by electromagnetic or other suitable means.

The novel features of the invention, both as to its organization and method of operation, as well as additional objects and advantages thereof, will be more apparent from the following description, when read in connection with the accompanying drawings in which.

Figure 1:
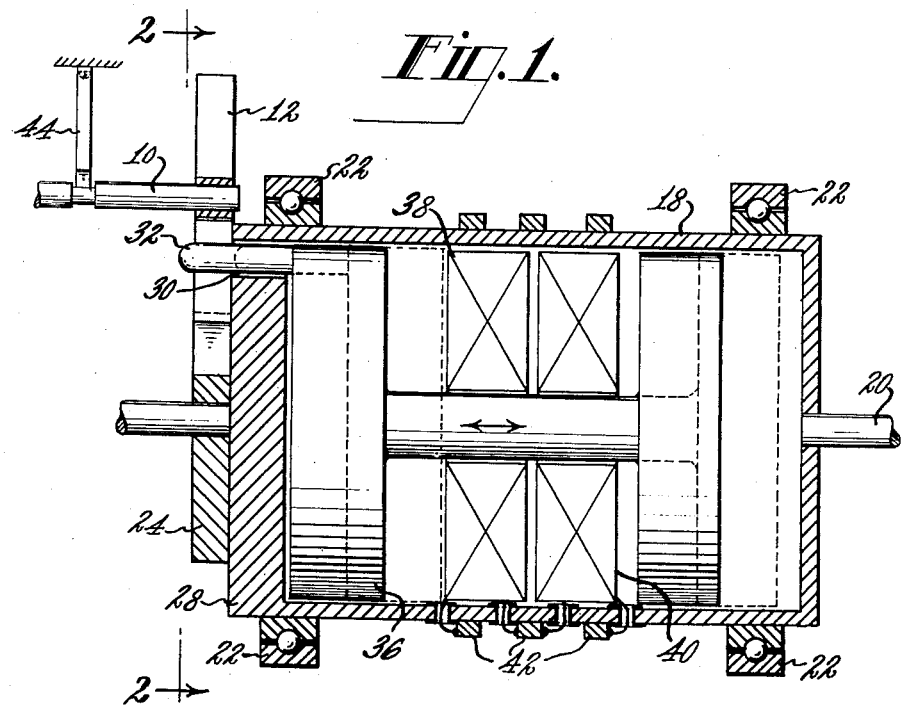
Figure 1 is a cross-sectional, elevational view of one embodiment of this invention.
Figure 2:
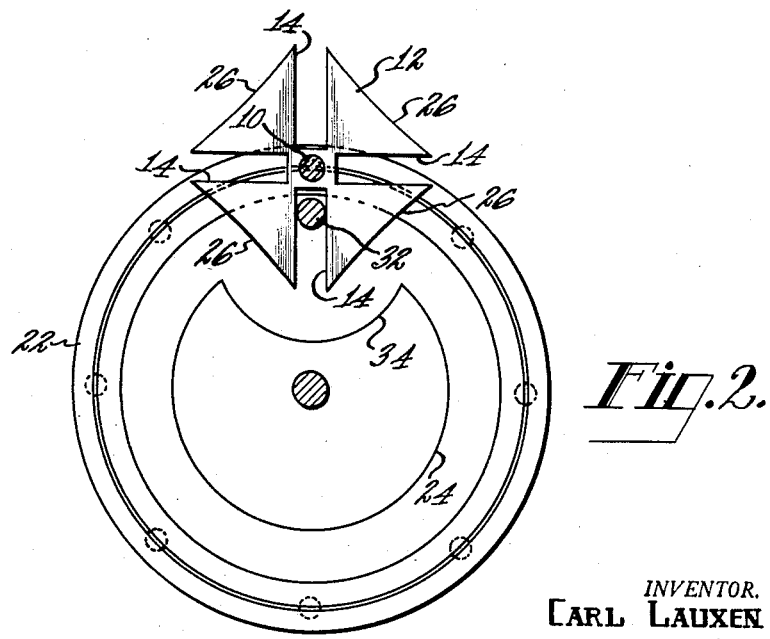
Figure 2 is an end elevational view of the embodiment taken on the plane of the line 2—2 of Figure 1.

Referring more particularly to Figures 1 and 2, there is shown a driven shaft 10 fixed to a star wheel 12, illustrated in the drawings as a Maltese cross. The star wheel 12 contains a plurality of radial slots 14. The sides 26 of the star wheel 12 are concave. The shaft 10 and the star wheel 12 comprise the driven unit of the Geneva mechanism.

Generally, a driving unit of a Geneva mechanism may comprise a rotating member, a driving pin displaced from the center of the rotating member so as to engage with successive radial slots of the star wheel, and a concentric barrel which is so arranged as to turn in the concave sides of the star wheel.

In the preferred embodiment, shown in Figures 1 and 2, the rotor 18 is constructed in the form of a hollow cylinder, one end of which is coupled to a drive shaft 20. The drive shaft 20 is coupled to a power source, such as a motor (not shown), and is rotated continuously, whereby the rotor 18 rotates continuously. The rotor 18 may be supported through suitable ball bearing couplings 22.

A concentric barrel 24 is arranged at the opposite end or face of the rotor 18, to turn in the concave, outer sides 26 of the star wheel 12 so as to lock the star wheel between successive actuations thereof. The concentric barrel 24 is attached to the end of rotor 18 by a face plate 28, which fully closes that end of the rotor 18 except for an opening 30 through which a driving pin 32 may pass. The barrel 24 is provided with a cut-away portion 34 to permit the points of the star wheel 12 to clear the barrel 24 when the star wheel 12 is driven.

An armature 36 is disposed within the rotor 18. In the embodiment shown in Fig. 1, the armature 36 is a soft iron "dumbbell" in the form of a pair of cylinders connected through their axes by a rod. The armature is designed to have a sliding longitudinal motion within the rotor 18. Coupled to the armature 36 are a pair of coils 38 and 40 which surround the armature 36 circumferentially near its center.

By energizing one or the other of the coils 38 and 40, the armature 36 may be moved longitudinally to the right or left, as desired. The leads of the coils 38 and 40 are connected to slip rings 42 located on the external circumference of the rotor 18, thus facilitating energization of the appropriate coil 38 or 40 through the use of suitable commutator brushes (not shown).

At a point on the outer end of the armature 36 displaced from the center of rotation is the driving pin 32. The driving pin 32 is so located as to pass through the opening 30 of the face plate 28. The concentric barrel 24 and pin 32 act as the driving unit of a Geneva mechanism wherein the pin 32 may be engaged with successive ones of the radial slots 14 of the star wheel 12.

When the coil 38 nearest to the face plate 28 is energized, the armature 36 moves to the right (as viewed in Figure 1). This causes the pin 32 to retract and disengage from star wheel 12. When the coil 40 is energized, the armature moves to the left and the pin 32 comes into operational engagement with the star wheel 12. Thus, input to the unit (mechanical rotation) is continuously applied but the output is on demand only.

Demand consists of electrically energizing the coil 40 to cause the armature 36 to move to the left and thereby position the pin 32 in one of the slots 14 of the star wheel 12. The demand pulse must be timed in such a manner as to prevent the pin 32 from engaging the star wheel 12 improperly, since improper engagement, as where the pin 32 engages a portion of the star wheel 12 other than at the slots 14, would be destructive. The slip rings 42 are provided on the rotor 18 to provide a means of conducting current to the coils 38 and 40.

Timing of the demand pulse may be accomplished by insulating portions 43 of the slip rings 42, thus preventing improper engagement of the pin 32 and the star wheel 12.

The star wheel 12 is coupled via the driven shaft 10 or other means to a detent or positioning mechanism 44, which may be in the form of a spring-pressed pad, for example, which applies just sufficient pressure against the shaft 10 to prevent it from rotating freely. This operates to avoid another source of interference between pin and star wheel at engagement. Without some mechanism which will retain the star wheel in proper position for pin engagement, vibration may cause the star wheel to move out of such position and thus cause interference.

Figure 3:
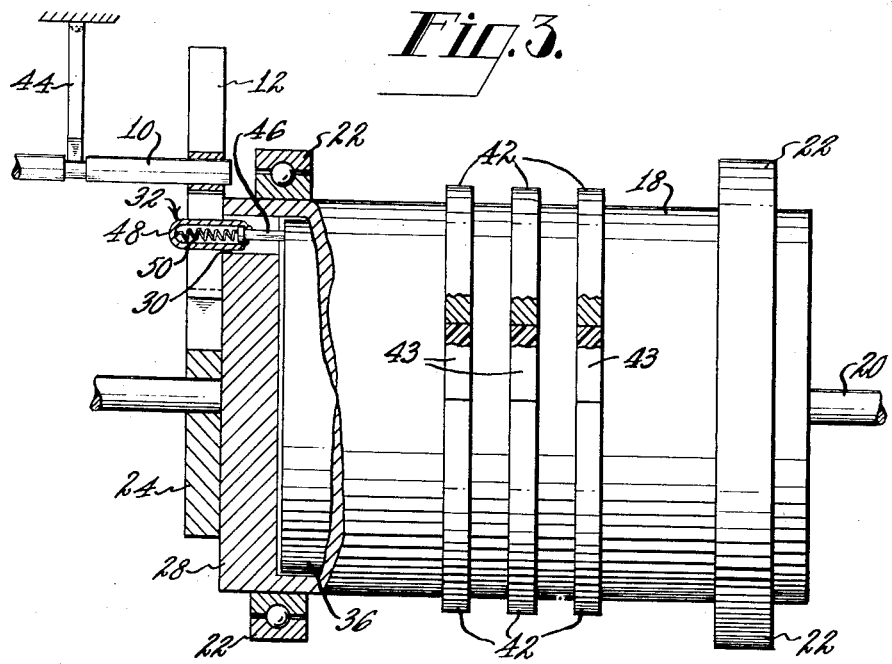
Figure 3 shows a pin structure for use with this invention.

The necessity of timing to prevent improper cooperation between the pin 32 and the start wheel 12 may be eliminated by constructing the driving pin as shown in Figure 3. Here, the driving pin 32 comprises a peg 46 enclosed by a shell 48 and biased by a spring 50. Therefore, if the driving pin were injected into the star wheel 12 at such a time as there may be interference, the shell 48 would retract the deflecting spring 50 and would store sufficient energy to drive the outer portion of the pin 32 (i. e., the shell 48) into the star wheel 12 after the interference disappears.

In employing the spring loaded pin as in Figure 3, another reason for coupling a detent mechanism to the star wheel becomes evident. Friction between the end of the pin and the side of the star wheel might cause undesirable movement of the star wheel. However, the detent mechanism avoids this.

Although there may be lost time in waiting for the pin to complete a cycle and re-engage the star wheel, it should be noted that this lost time diminishes considerably as the input speed of the rotor is increased. The amount of increase available, within the limit supplied by the accelerating forces in the star wheel and pin, will effectively compensate for any lost time. In designing the coils and the armature, the time for a magnetic field to build up or collapse should be carefully considered. To this end, these coils may be of the type employed in radio loud speaker voice coil designs. Thus, higher actuating speeds, on the order of audio frequencies, might be attained. It is worth noting that the pin normally would present a small load to such a voice coil assembly. An embodiment of this invention, employing a voice coil assembly, is illustrated in Figure 4.

Figure 4:
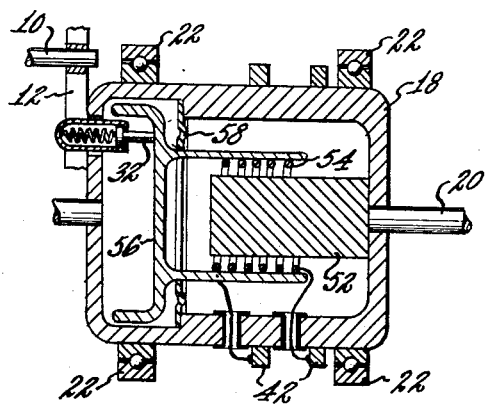
Figure 4 is a cross-sectional view showing another embodiment of this invention.

In the embodiment of Figure 4, the hollow rotor 18 is connected to the shaft 20 and is constantly rotated. Suitable bearings may be provided (not shown). Concentric with the shaft 20, and coupled thereto within the rotor 18, is a permanent magnet 52. Circumferentially surrounding the magnet 52 is a voice coil 54. The coil 54 is connected, through appropriate leads, to the slip rings 42 which are provided on the outer surface of the rotor 18.

The voice coil 54 is mechanically coupled to a piston 56 which retains the coil 54 in concentric relationship with the magnet 52. The piston 56 is restrained by a diaphragm spring 58 tending to keep the piston 56 in one particular longitudinal position. Energization of the voice coil 54 will deflect the piston longitudinally. Upon deenergization of the voice coil, the diaphragm spring will act to "reset" the piston to its original, longitudinal position.

Attached at a point on the piston displaced from its center, parallel to the axis of rotation, is the driving pin 32. This pin may be of the improved type shown in Figure 3. In this arrangement, the coil 54 moves upon demand and, in turn, moves the pin 32. As in radio loud speaker designs, a permanent magnet, such as Alnico, may be employed. The device operates as follows:

Power is supplied on demand to the slip rings 42 to energize the voice coil 54 thereby creating a magnetic field which reacts with the magnetic field provided by the permanent magnet 52 to move the coil 54 axially along the magnet in well known manner. The voice coil 54 is connected to a piston 56 which, in turn, holds the pin 32. By energizing the voice coil 54, the piston 56 retracts, thus retracting the pin 32. When the voice coil 54 is deenergized, the pin 32 moves back into position in engagement with the star wheel in response to the force applied by the diaphragm spring 58 on the piston.

The device in Figure 4 may be constructed, without deviating from the basic concept, so that energization of the voice coil will cause the driving pin to engage with the star wheel in lieu of being disengaged therefrom. Modifications using a multichanneled star wheel in place of a Maltese cross as shown in the drawings, will be apparent to one skilled in the art. It is to be understood, of course, that the invention is not limited to the embodiments shown and described but is capable of various modifications and further embodiments without departing from the spirit and scope of the appended claims.

What is claimed is:

1. In a system for transmitting intermittent motion, a driven disc provided with radial slots, a driving rotor, a slidably mounted armature arranged to rotate with said rotor, a driving pin projecting from said armature, and electromagnetic means for sliding said armature back and forth at will in relation to said rotor to thereby move the driving pin into and out of position for engagement with said slots.

2. In a system for transmitting intermittent motion, a driven disc provided with radial slots, a driving rotor, a slidably mounted armature arranged to rotate with said rotor, a driving pin projecting from said armature, and means comprising a coil for sliding said armature back and forth in relation to said rotor in response to an electrical signal to thereby move said driving pin into and out of position for engagement with said slots.

3. In a system for transmitting intermittent motion, a star wheel, a rotor, an armature slidably carried by said rotor and arranged to rotate with said rotor, a driving pin projecting from said armature and movable longitudinally therewith in relation to said rotor, a pair of coils carried by said rotor in association with said armature, means for energizing said coils whereby, when one of said coils is energized, said armature will retract and move said driving pin to a position where it is incapable of engagement with said star wheel, and whereby, when the other of said coils is energized, said driving pin will be moved to a position wherein it is capable of engagement with said star wheel.

4. In a system for transmitting intermittent motion, a star wheel, a rotor, an armature carried by said rotor to slide longitudinally in relation to said rotor and arranged to rotate with said rotor, a driving pin projecting from said armature adapted to engage with said star wheel, and electromagnetic means for energizing said armature whereby said pin may be moved into and out of position for engagement with said star wheel.

5. In a system for transmitting intermittent motion, a star wheel, a rotor, an armature carried by said rotor to slide longitudinally in relation to said rotor and arranged to rotate with said rotor, a driving pin projecting from said armature adapted to engage with said star wheel, coil means carried by said rotor for coaction with said armature whereby said pin may be moved into and out of position for engagement with said star wheel upon energization of said coil means, and slip rings for receiving energy provided on said rotor having connections to said coil means.

6. The device as claimed in claim 5 wherein said slip rings include insulated portions whereby said pin may be moved into position for engagement with said star wheel at desired times.

7. The device as claimed in claim 5 wherein said device includes timing means for preventing said pin from moving into position for engagement with said star wheel at times when said engagement is not desired.

8. In a system for transmitting intermittent motion, the combination comprising a star wheel, a rotor, an armature slidably carried by said rotor to slide longitudinally in relation to said rotor and arranged to rotate with said rotor, a driving pin projecting from said armature adapted to engage with said star wheel, and means operable upon demand to cause said pin to slide longitudinally into position for desired engagement with said star wheel.

9. The combination as claimed in claim 8, further including a positioning mechanism for said star wheel.

10. The combination as claimed in claim 8, wherein said pin is spring biased.

11. The combination as claimed in claim 10, further including a positioning mechanism for said star wheel.

References Cited in the file of this patent

UNITED STATES PATENTS 2,795,150     Seidler  ---------------- June 11, 1957

FOREIGN PATENTS 903,991     France  ---------------- Feb. 12, 1945